United States Patent [19]
Bejerano

[11] 4,270,155
[45] May 26, 1981

[54] TRANSDUCER POSITIONING APPARATUS

[75] Inventor: Abraham Bejerano, Costa Mesa, Calif.

[73] Assignee: BASF Aktiengesellschaft, Rheinland-Pfalz, Fed. Rep. of Germany

[21] Appl. No.: 52,739

[22] Filed: Jun. 28, 1979

[51] Int. Cl.³ ............... G11B 21/08; G11B 21/12; G11B 21/24; G11B 5/56

[52] U.S. Cl. .................................. 360/106; 360/78; 360/109

[58] Field of Search .................. 360/106, 109, 78

[56] References Cited

U.S. PATENT DOCUMENTS

| 3,770,905 | 11/1973 | Sperry | 360/109 |
| 4,020,506 | 4/1977 | Barrett et al. | 360/106 |
| 4,041,539 | 8/1977 | Robarge | 360/106 |

Primary Examiner—Robert S. Tupper
Attorney, Agent, or Firm—Fulwider, Patton, Rieber, Lee & Utecht

[57] ABSTRACT

Apparatus for positioning a transducer head in a prescribed relationship relative to a selected track on a recording medium. The apparatus includes a lead screw that is threadedly coupled to a bracket for supporting the transducer head, whereby a controlled rotation of the lead screw functions to move the transducer head along the surface of the recording medium, to the prescribed position. Rotation of the lead screw is controlled by a geneva mechanism that includes geneva wheel coupled to the lead screw and a geneva driver driven by a reversible d-c motor. Each revolution of the geneva driver rotates the geneva wheel, and thus the lead screw, through a prescribed angle, such that the transducer head is moved along the recording medium by a prescribed amount, such as one track spacing.

9 Claims, 9 Drawing Figures

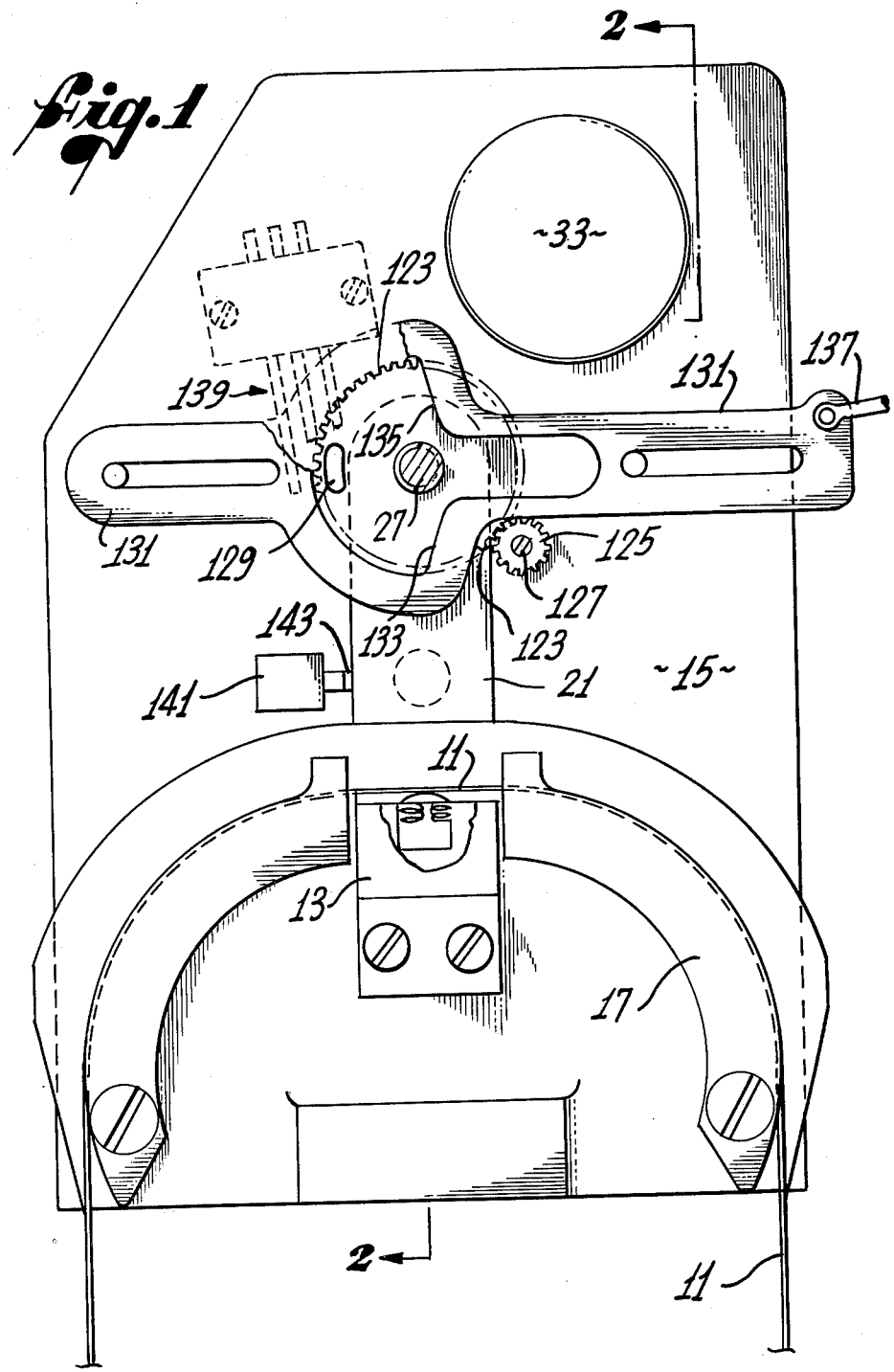

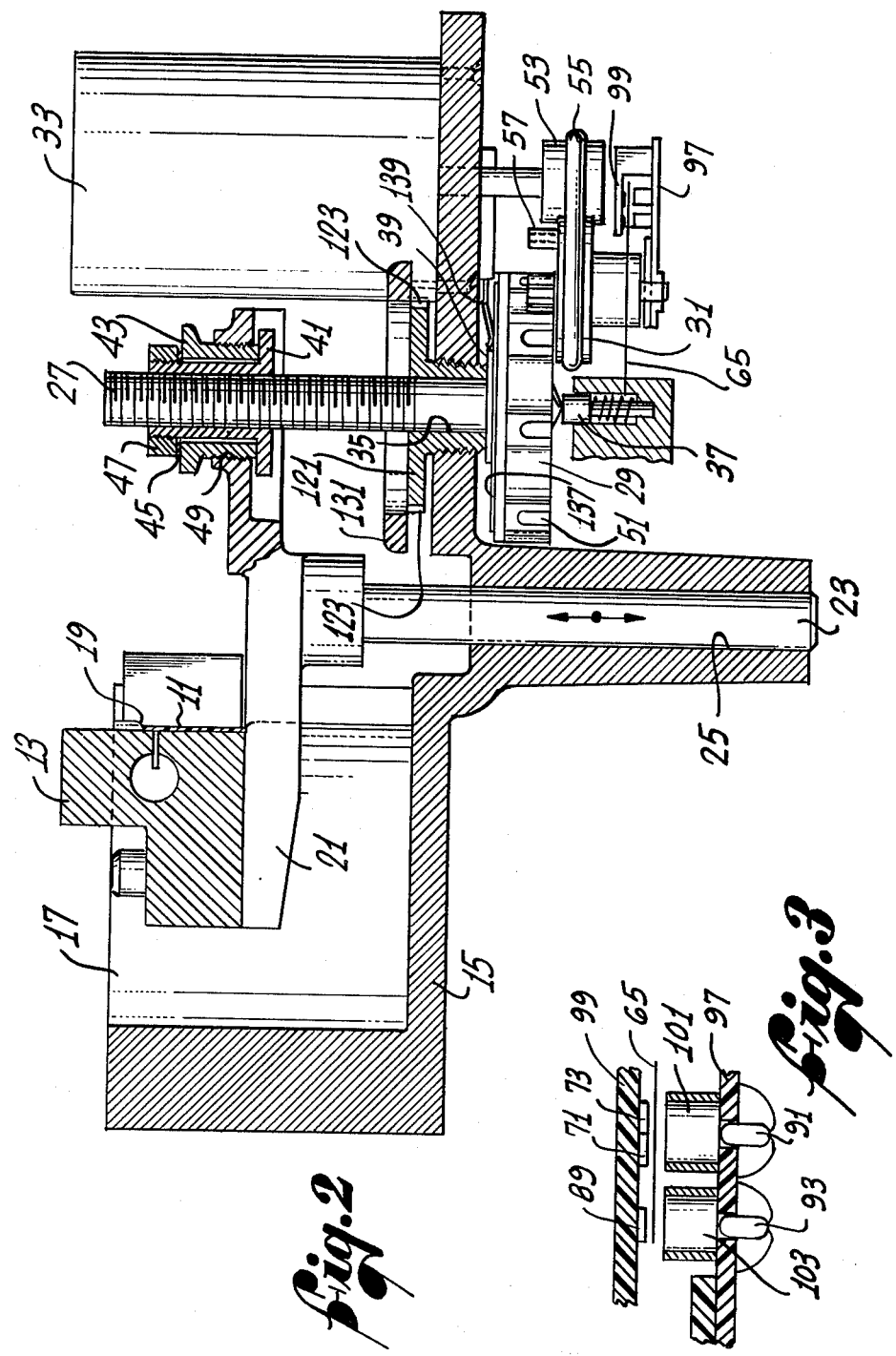

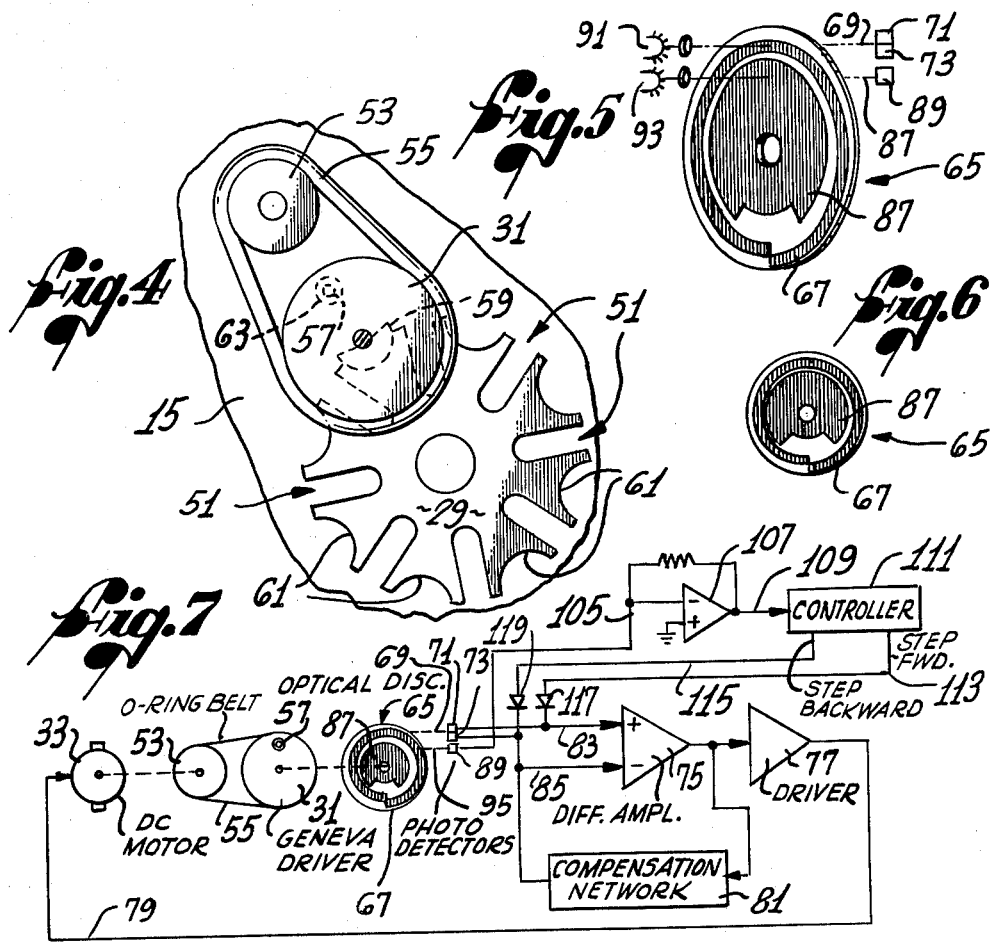

TRANSDUCER POSITIONING APPARATUS

BACKGROUND OF THE INVENTION

This invention relates generally to transducer positioning apparatus and, more particularly, to improvements in apparatus for positioning a transducer head in a prescribed relationship relative to a selected track on a recording medium such as a magnetic tape.

A related application for U.S. Pat. Ser. No. 052,738, filed in the name of A. Bejerano et al and entitled "Optical Control System for Transducer Positioning Apparatus" is directed to an optical control system for use with transducer positioning apparatus of the present invention.

An example of a transducer positioning apparatus of this particular type is disclosed in U.S. Pat. No. 4,144,549, issued in the name of D. L. Burdorf et al and entitled "Transducer Positioning Device". As described in that patent, such apparatus includes a frame having a guide to direct the tape past the transducer head, and a cam mounted for rotation on the frame and having a graduated series of planar steps formed in its upper surface. The transducer head is carried by a platform assembly having a bearing post that is maintained in continuous contact with the steps of the cam, whereby controlled rotation of the cam causes the head to move upwardly or downwardly to prescribed positions corresponding to the positions of recording tracks on the magnetic tape.

One drawback to the aforedescribed prior art device arises when it is adapted for use with a recording tape having a relatively large number of tracks arranged in a very closely-spaced relationship. In such situations the cam must be formed with extreme accuracy and precision, so as a consequence, the manufacturing costs associated with this apparatus are relatively high. Additionally, since each of the graduated, planar steps of the rotatable cam corresponds to a separate track on the tape, the steps must be made exceedingly small. For example, when recording tapes having 72 tracks are used, each step of the cam can subtend, at most, only 5 degrees of arc. As a consequence, it can sometimes be difficult to index the transducer head by a prescribed number of tracks, without experiencing an overshoot onto the next successive track.

Another transducer positioning apparatus of this particular type is disclosed in U.S. Pat. No. 4,041,539, issued in the name of W. A. Robarge and entitled "Tape Head Shift Apparatus for Multi-Track Tape Player". The apparatus disclosed in that patent includes a rotatable cylindrical cam that is indexed by a geneva mechanism, in combination with a rather elaborate gearing mechanism. Although the apparatus is likely effective in incrementing the cam through a precise angle, it is nevertheless subject to high manufacturing costs, especially when adapted for use with a recording tape having a relatively large number of closely-spaced tracks.

It will be appreciated from the foregoing that there is still a need for apparatus that can accurately position a transducer head in a prescribed relationship relative to a selected track on a recording medium, without involving undue manufacturing costs, and without involving the possibility of overshooting the selected track when indexing the transducer head from one track to another. The present invention fulfills this need.

SUMMARY OF THE INVENTION

The present invention is embodied in an improved transducer positioning apparatus for controllably positioning a transducer head in a prescribed relationship relative to a selected track on a recording medium. In accordance with the invention, the apparatus includes a lead screw that is mounted for rotation on the frame of the apparatus and that is threadedly coupled to means for supporting the transducer head relative to the recording medium, along with means for rotating the lead screw in a prescribed fashion, to controllably move the support means, and thereby position the transducer head in the prescribed relationship relative to the selected track. As a result, the need for a precisely machined cam is avoided, and the difficulty associated with having relatively small cam steps is avoided.

More particularly, a transducer positioning apparatus constructed in accordance with the present invention is especially adaptable for use in a video tape recorder of the longitudinal type, wherein the recording tracks on the magnetic tape are arranged in a spaced, parallel relationship across the width of the tape. The apparatus includes a frame that has means for guiding the magnetic tape along a horizontal path past the transducer head, and the lead screw is mounted on the frame for rotation about a vertical axis, whereby rotation of the lead screw functions to move the transducer head upwardly or downwardly along the surface of the magnetic tape, from one track to another. It will be understood that references made herein to directional orientations of the elements of the apparatus are made solely for the purpose of describing their relative positions, and the invention is not, of course, limited to a particular orientation.

In accordance with another aspect of the present invention, the lead screw is controllably rotated or indexed by a geneva mechanism that includes a geneva wheel coupled to the lead screw and a geneva driver rotatably driven by reversible motor means. Each revolution of the geneva driver functions to rotate the geneva wheel by a prescribed angle and thereby index the transducer head by a prescribed amount, such as one track spacing.

In still another aspect of the present invention, the apparatus further includes fine adjustment means for controllably moving the lead screw in a vertical or axial direction, to effect a fine adjustment of the position of the transducer head relative to the selected track. More specifically, the fine adjustment means includes a rotatable member that is threadedly received in a threaded bore formed in the apparatus frame, such rotatable member being coupled to the lead screw in such fashion that the lead screw can be rotated with respect to it but is prevented from movement axially with respect to it. As a result, a controlled rotation of the rotatable member with respect to the frame effects a corresponding movement axially with respect to the frame, thereby correspondingly moving the lead screw axially and effecting a fine positioning of the transducer head relative to the selected track.

The rotatable member can advantageously comprise a thrust bushing in which the lead screw is journaled and which is externally threaded for threaded engagement with the apparatus frame. Relative axial movement between the lead screw and the bushing can be prevented, for example, by spring-biasing a shoulder formed in the lead screw into abutment with one end of the bushing.

The bushing can include a plurality of gear teeth formed on a peripheral surface and it can be rotated relative to the frame by a pinion gear engagable with the teeth. Thus, a controlled, manual rotation of the pinion gear effects a corresponding rotation of the bushing in the threaded bore of the frame, thereby moving the bushing, and thus the lead screw, along a vertical axis, to adjust the relative position of the transducer head. Additionally, the fine adjustment means includes a tab projecting upwardly from an off-center location on the thrust bushing, along with cam means selectively engagable with the tab to re-position the rotatable member to a prescribed nominal position. This re-positioning can be performed, for example, when removing a magnetic tape cartridge from the video recorder.

Many other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

FIG. 1 is a top plan view of an apparatus embodying the present invention, for positioning a transducer head in a prescribed relationship relative to a selected track on a recording tape;

FIG. 2 is a side sectional view of the transducer positioning apparatus, taken substantially along the line 2—2 in FIG. 1;

FIG. 3 is a detailed sectional view of the optical disc and photodetector portion of the apparatus of FIG. 1;

FIG. 4 is an enlarged, detailed bottom plan view of the geneva mechanism for rotating the lead screw of the apparatus of FIG. 1;

FIG. 5 is an elongated, exploded perspective view of the optical disc and associated LED's and photodetectors of the apparatus of FIG. 1;

FIG. 6 is a plan view of the optical disc of FIG. 5;

FIG. 7 is a simplified block diagram of the optical control system for controllably rotating the lead screw to position the transducer head in the prescribed position relative to the selected track; and FIG. 8 is a plot of the output signal from the differential amplifier versus the angular position of the optical disc in the optical control system of FIG. 7;

FIG. 9 is a timing diagram illustrating the step forward and engagement pulse signals that are utilized in the optical control system of FIG. 8.

DESCRIPTION OF THE PREFERRED EMBODIMENT

Referring now to the drawings, and particularly to FIGS. 1 and 2, there is shown a transducer positioning apparatus constructed in accordance with the preferred embodiment of the present invention. The apparatus is used with a longitudinal video tape recorder in which a magnetic tape 11 having a plurality of parallel and equally-spaced recording tracks is driven past a magnetic transducer head 13.

The apparatus includes a frame 15 that is fixed in relationship to the recorder chassis (not shown) and that includes an upstanding portion 17 having a guide 19 in the form of a shallow trough for directing the tape along a horizontal path past the transducer head 13. The transducer head is supported on a horizontally-disposed support bracket 21 that is movable along a vertical axis to position the head adjacent to a selected track on the tape. The support bracket is guided along the vertical axis by an integral shaft 23 that is slidably received in a bore 25 formed in a portion of the apparatus frame. It will be understood that references made herein to directional orientations are made solely for purposes of explanation and are not to be construed as limitations of the invention.

In accordance with the invention, the support bracket 21, and thus the transducer head 13, are controllably movable along a vertical axis by means of a lead screw 27 mounted for rotation on the frame 15, thereby controllably positioning the transducer head in the prescribed relationship relative to the selected recording track. Additionally, the angular position of the lead screw is precisely controlled by a geneva mechanism that includes a geneva wheel 29 coupled to the lead screw and a geneva driver 31 that is driven by a reversible d-c motor 33. Each revolution of the geneva driver functions to rotate the geneva wheel, and thus the lead screw, by a prescribed angular amount, thereby indexing the transducer head by a distance equal to one track spacing.

As shown in FIG. 2, the lead screw 27 is journaled in a thrust bushing 35 that is threadedly secured to the apparatus frame 15. The lead screw is restrained from axial movement relative to the bushing by means of spring-biased plunger 37 mounted on the frame. The plunger abuts one end of the lead screw and urges an outwardly-projecting shoulder 39 on the lead screw into abutment with one end of the thrust bushing.

The lead screw 27 is fixedly secured to the support bracket 21 by a special assembly that includes a lead screw follower nut 41, a spacer bushing 43, a wave spring washer 45, and a nut 47. The follower nut is threadedly secured to the lead screw at a convenient location thereon, and the spacer bushing, which has external threads formed therein, is threadly secured to a threaded bore 49 in the support bracket. The follower nut and lead screw are disposed within the central opening in the spacer bushing and secured thereto by the wave spring washer 45 and the nut 47, which threadedly engages an externally-threaded portion of the follower nut. It will be noted that the follower nut fits relatively loosely in the central opening of the spacer bushing, to accommodate manufacturing tolerances in the apparatus, but the two elements nevertheless are fixed securely to each other by means of the nut 47.

As shown in FIG. 4, the geneva wheel 29 includes eight uniformly-spaced and radially-aligned slots 51, and the d-c motor 33 is coupled to the geneva driver 31 by means of a pulley 53 and an O-ring belt 55. The geneva driver is disc-shaped and includes a pin 57 that projects upwardly from an off-center location thereon and that is engagable with the spaced slots formed in the geneva wheel. Each complete revolution of the geneva driver functions to rotate the geneva wheel, and thus the lead screw 27, through one-eighth of a revolution, i.e., 45 degrees.

When the pin 57 of the geneva driver 31 is positioned away from the geneva wheel 29, the wheel is prevented from rotating by an upstanding convex shoulder or cam 59 that is disposed near the center of the geneva driver and that engages one of a plurality of corresponding concave cam surfaces 61 located between each of the spaced slots 51 in the geneva wheel. Additionally, the geneva driver pin has a rotatable bushing 63 surrounding it to reduce the effects of wear, from repeated engagement with the spaced slots.

As shown in FIG. 7, the apparatus further includes an optical servo mechanism for automatically positioning the pin 57 of the geneva driver 31 at a location diametrically away from the geneva wheel 29, thereby locking the wheel, and thus the transducer head 13, in their respective positions. The servo includes the reversible d-c motor 33 for rotating the geneva driver 31 via the pulley 53 and the O-ring belt 55, along with an optical disc 65 that is coupled to the geneva driver and that is rotated in correspondence therewith. The disc includes an outer track 67 in the form of a spiral-shaped strip of opaque material, for selectively blocking transmission of a beam of light 69, in accordance with the angular position of the disc. The servo further includes a pair of photodetectors 71 and 73 for receiving the transmitted beam, and an associated differential amplifier 75 for producing an error signal indicative of the angular position of the optical disc. Finally, the servo includes a driver 77 for amplifying the error signal to produce a motor drive signal for coupling over line 79 to the d-c motor 33, to appropriately drive the geneva driver to its prescribed position. The servo is compensated in a conventional manner by a phase and amplitude compensation network 81, coupled between the output terminal and inverting input terminal of the differential amplifier 75.

The two photodetectors 71 and 73 are positioned to receive portions of the beam of light 69 that are not blocked by the spiral track 67 on the optical disc 65, and the resultant electrical current output signals of the two photodetectors are coupled over lines 83 and 85 to the respective non-inverting and inverting input terminals of the differential amplifier 75. The resulting error signal produced by the differential amplifier, which is substantially proportional to the difference between the two current signals, varies substantially linearly with the angular position of the geneva driver 31, intersecting a zero-volt threshold at an angular position wherein the pin 57 of the geneva driver is positioned diametrically away from the geneva wheel 29.

As shown in FIG. 5, the optical disc 65 includes two tracks, the outer, spiral track 67, associated with the two photodetectors 71 and 73 for producing the aforementioned error signal, and an inner track 87 associated with a separate photodetector 89 for producing an engagement pulse signal indicating that the geneva driver pin 57 is engaged in a slot 51 in the geneva wheel 29. The outer and inner tracks are associated with separate light-emitting diodes (LED's) 91 and 93, respectively, for emitting beams of light 69 and 95 that are directed at the disc and transmitted to the corresponding photodetector(s) in accordance with special opaque patterns that form the two tracks.

As shown in FIG. 3, the LED's 91 and 93 and the photodetectors 71, 73, and 89 are mounted on printed circuit boards 97 and 99, respectively, that are positioned on opposite sides of the optical disc 65. Additionally, special cylindrical elements 101 and 103 are secured to the printed circuit board 97 to direct the respective beams of light 69 and 95 only at the appropriate photodetectors.

As best observed in FIG. 6, which is a plan view of the optical disc 65, the outer track 67 comprises one revolution of a spiral strip of opaque material, with the spiral arranged such that whenever its mid-point is positioned adjacent the two photodetectors 71 and 73, the geneva driver pin 57 is automatically positioned diametrically away from the geneva wheel 29. Also, the spiral is sized such that when its mid-point is disposed adjacent the two photodetectors, photodetectors are illuminated equally by portions of the beam of light 69 directed past the sides of the spiral. When the disc is in this nominal position, the electrical currents generated by the two photodetectors are substantially equal in magnitude and the error signal produced by the differential amplifier 75 is essentially zero. As a result, the d-c motor 33 is not driven in either direction, and the geneva wheel, and thus the transducer head 13, are locked in their respective positions.

If the optical disc 65 happens to be rotated in a clockwise direction from this nominal position, however, the radius of the portion of the spiral track 67 disposed in front of the two photodetectors 71 and 73 decreases, and, as a consequence, the photodetector 71 is illuminated by a greater amount than the photodetector 73 and the error signal will be correspondingly positive. This positive error signal is amplified in the driver 77 and coupled over line 79 to the d-c motor 33, which responds by driving the pulley 53 and, in turn, the geneva driver 31 in a counterclockwise direction, to restore the optical disc to its nominal position. Similarly, if the disc happens to be rotated in a counterclockwise direction from the nominal position, the radius of the spiral segment disposed directly in front of the two photodetectors is larger and the photodetector 71 is illuminated by a lesser amount than the photodetector 73 and the error signal will be correspondingly negative. The negative error signal will therefore result in the geneva driver being driven in a clockwise direction, to restore the optical disc to its nominal position.

The inner track 87 on the optical disc 65 is opaque over most of its circumference, transmitting light to its associated photodetector 89 over an arc of only about 90 degrees, centered at a circumferential location on the disc diametrically opposed to that of the mid-point of the outer, spiral track 67. This transparent region corresponds to the engagement of the geneva driver pin 57 in one of the slots 51 in the geneva wheel 29.

An electrical current signal produced by the photodetector 89 for the inner track 87 is transmitted over line 105 to an amplifier 107 to produce the aforementioned engagement pulse signal. This signal is coupled over line 109 from the amplifier to a controller 111, which produces step forward and step backward control pulse signals for coupling over lines 113 and 115, respectively, to the differential amplifier 75, to move the transducer head 13 upwardly or downwardly, accordingly. These pulse signals are produced in accordance with instructions supplied to the controller from, for example, a manually-actuated track selection switch (not shown) located on the video recorder, or circuitry (not shown) for detecting that the end of the tape 11 has been reached and that the transducer head must be incremented to the next successive track.

The step forward and step backward control pulse signals are coupled through diodes 117 and 119, respectively, to the non-inverting and inverting input terminals of the differential amplifier 75. The two signals are normally biased at voltages such that the two diodes are reverse-biased, whereby they do not affect the coupling of current from the respective photodetectors 71 and 73 to the differential amplifier.

When the transducer head 13 is to be re-positioned at a new recording track, however, the voltage of the appropriate step forward or step backward control pulse signal is made sufficiently positive to forward-bias the corresponding diode 83 or 85, thereby overriding the current signal supplied by the corresponding photodetector 71 or 73 and driving the differential amplifier 75 into saturation. Thus, when a step forward pulse signal occurs, the differential amplifier is saturated at a positive voltage, causing the d-c motor 33 to rotate the geneva driver 57 in the appropriate angular direction to move the transducer head 13 forward to the next successive recording track. Conversely, when a step backward pulse signal occurs, the differential amplifier is saturated at a negative voltage, causing the d-c motor to rotate the geneva driver in the opposite direction, to move the transducer head back to the previous recording track.

The respective step forward and step backward control pulse signals are terminated only when the controller 111 has determined, by monitoring the engagement pulse signal supplied on line 109, that the geneva driver pin 57 is no longer engaged in a slot 51 in the geneva wheel 29. Thereafter, the optical servo again functions in the above-described manner to position the geneva driver pin at the circumferential location diametrically opposed to the geneva wheel.

In practice, it has been determined that it normally requires approximately 30–35 milliseconds from the initiation of either a step forward or step backward pulse until the geneva driver pin 57 first engages a slot 51 in the geneva wheel 29, and that it normally requires an additional 10–15 milliseconds thereafter until the pin has rotated the geneva wheel by 45 degrees and disengaged from the slot. Thus, each step forward or step backward control pulse normally has a duration of approximately 40–50 milliseconds. Additionally, it has been found that, after each step forward or step backward control pulse has terminated, it normally requires approximately 40–60 milliseconds for the optical servo mechanism to re-position the geneva driver pin at its stable location, diammetrically opposite the geneva wheel. Accordingly, additional step backward or step forward control pulses can be produced at that time, if it is desired to index the transducer head 13 still further.

To minimize the consumption of power in the servo mechanism, the supply of electrical current to the d-c motor 33 is interrupted after at least about 60 milliseconds have elapsed following termination of a step forward or step backward control pulse. Additionally, as a fail-safe procedure, power to the d-c motor is interrupted if, for any reason, it is determined by the controller 111 that the geneva driver pin 57 has not engaged a slot 51 in the geneva wheel 29 within approximately 100 milliseconds, or that the pin has remained engaged in a slot for a duration in excess of about 100 milliseconds. Such events will normally occur only if the geneva mechanism has become jammed in some manner, so this fail-safe procedure is included to prevent possible damage to the d-c motor 33.

With reference again to FIGS. 1 and 2, and in accordance with another aspect of the present invention, the transducer positioning apparatus further includes fine adjustment means for controllably moving the lead screw 27 in a vertical or axial direction, to effect a fine adjustment of the position of the transducer head 13 relative to the selected track on the magnetic tape 11. This feature is particularly useful when the video recorder is being utilized to play back a magnetic tape previously recorded on by another recorder.

More specifically, the thrust bushing 35, which journals the lead screw, and against which the lead screw is spring-biased to prevent relative axial movement, can be controllably rotated with respect to the frame 15, to move the bushing, and thus the lead screw, in an axial direction and thereby effect the fine positioning of the transducer head. The thrust bushing 35 includes a radially outwardly projecting flange 121 that includes a plurality of gear teeth 123 formed in its outer periphery, and the bushing can be rotated by means of a pinion gear 125 mounted on the frame 15 and engagable with the teeth on the flange. The pinion gear can be controllably rotated using a screw driver to engage a conventional slot 127 formed in its exposed surface.

The fine adjustment means further includes a tab 129 projecting upwardly from a portion of the flange 121 of the thrust bushing 35, along with a lever 131 that is slidably mounted to the frame 15 and that has a pair of linear cam surfaces 133 and 135 for selectively engaging the tab. Thus, whenever the thrust bushing has been rotated to adjust the position of the transducer head 13, thereby rotating the tab away from its nominal position (FIG. 1), the tab can be returned to such position by sliding the lever until the tab is engaged by one of the cam surfaces. This lever can be conveniently actuated by suitable linkage, a portion of which is shown at 137, that is actuated, for example, whenever a magnetic tape cassette (not shown) is removed from the video recorder.

The transducer positioning apparatus further includes a conventional disc-shaped commutator 137 secured to one surface of the geneva wheel 29 and rotatable in correspondence therewith. Also, the apparatus includes a set of contact brushes 139 for contacting the commutator disc to monitor the angular position of the wheel, and thus the lead screw 27. Additionally, the apparatus includes a limit switch 141 that is mounted on the frame 15 and that is engaged by a tab 143 projecting laterally from the transducer head support bracket 21. This switch is utilized to sense when the transducer head 13 is positioned at either the uppermost or lowermost track on the magnetic tape 11. Control circuitry (not shown) is included in insure that the controller 111 (FIG. 7) does not produce either a step forward or step backward control pulse signal to move the transducer head beyond such locations.

From the foregoing description, it should be apparent that the present invention provides an effective mechanism for accurately positioning a transducer head in a prescribed relationship relative to a selected track on a recording medium. The head is positioned by a lead screw that is controllably rotated through a precise angle by a geneva mechanism, thereby avoiding the need for a relatively costly rotatable cam.

While a particular form of the invention has been illustrated and described, it will be understood by one of ordinary skill in the art that various modifications can be made, without departing from the spirit and scope of the invention. Accordingly, it is not intended that the invention be limited, except as by the appended claims.

I claim:

1. Apparatus for positioning a transducer head in a prescribed relationship relative to a selected track on a recording medium such that information can be recorded on, or recovered from, the selected track, said apparatus comprising:
   a frame;
   a lead screw mounted for rotation on said frame;

means for supporting said transducer head, said means being threadedly coupled to said lead screw;
a geneva wheel coupled to said lead screw; and
a geneva driver, engagable with said geneva wheel, for controllably rotating said geneva wheel and thereby rotating said lead screw in a prescribed fashion, to controllably move said supporting means, and thereby position said transducer head in the prescribed relationship relative to the selected track on the recording medium.

2. Apparatus as defined in claim 1, wherein said geneva wheel includes eight equally-spaced and radially-aligned slots formed therein, whereby each revolution of said geneva driver functions to rotate the geneva wheel by 45 degrees.

3. Apparatus as defined in claim 1, wherein:
the recording medium includes a plurality of tracks arranged in a parallel and equally-spaced relationship; and
each revolution of the geneva driver results in the transducer head being moved a distance equal to one track spacing.

4. Apparatus for positioning a transducer head in a prescribed relationship relative to a selected track on a recording medium such that information can be recorded on, or recovered from, the selected track, said apparatus comprising:
a frame;
a lead screw mounted for rotation on said frame;
means for supporting said transducer head, said means being threadedly coupled to said lead screw;
means for rotating said lead screw in a prescribed fashion, to controllably move said supporting means, and thereby position said transducer head in the prescribed relationship relative to the selected track on the recording medium; and
fine adjustment means for controllably moving the lead screw in an axial direction, to effect a fine adjustment of the position of the transducer head relative to the selected track on the recording medium, said fine adjustment means including
a rotatable member having external threads formed therein, and
means defining a threaded bore in said frame for threadedly receiving said rotatable member;
wherein said rotatable member is coupled to said lead screw in such fashion that the lead screw can be rotated with respect thereto but is prevented from movement axially with respect thereto; and
wherein a controlled rotation of said rotatable member effects a corresponding movement of the member axially with respect to the frame, thereby correspondingly moving said lead screw axially with respect to the frame and effecting a fine positioning of the transducer head relative to the selected track on the recording medium.

5. Apparatus as defined in claim 4, wherein said lead screw is journaled in said rotatable member.

6. Apparatus as defined in claim 5, wherein:
said lead screw includes a radially-outwardly projecting shoulder; and
said fine adjustment means further includes means for biasing said shoulder into abutment with said rotatable member.

7. Apparatus as defined in claim 4, wherein:
said rotatable member includes a plurality of gear teeth formed on a peripheral surface thereof; and
said fine adjustment means further includes a pinion gear mounted on said frame and engagable with the gear teeth on said rotatable member, whereby a controlled rotation of said pinion gear effects a corresponding rotation of said rotatable member.

8. Apparatus as defined in claim 4, wherein said fine adjustment means further includes:
a tab projecting outwardly from an off-center location on said rotatable member; and
cam means selectively engagable with said tab to re-position said rotatable member to a prescribed, nominal position.

9. Apparatus for positioning a transducer head in a prescribed relationship relative to a selected one of a plurality of parallel and equally-spaced tracks on a recording medium such that information can be recorded on, or recovered from, the selected track, said apparatus comprising:
a frame;
a lead screw journaled in said frame;
means for supporting said transducer head, said means being threadedly coupled to said lead screw;
means for rotating said lead screw in a prescribed fashion, to controllably move said means for supporting, thereby positioning said transducer head in the prescribed relationship relative to the selected track on the recording medium, said means for rotating including
a geneva wheel coupled to said lead screw, and
a geneva driver, engagable with said geneva wheel, for controllably rotating said geneva wheel and thereby rotating said lead screw in the prescribed fashion, each revolution of the geneva driver functioning to move the transducer head a distance equal to one track spacing on the recording medium; and
fine adjustment means for controllably moving the lead screw axially, to effect a fine adjustment of the position of the transducer head relative to the selected track, said fine adjustment means including
a thrust bushing for journalling said lead screw, said bushing being threadly coupled to said frame, said lead screw including an outwardly projecting shoulder for compressive engagement with said bushing,
means for biasing the shoulder of said lead screw into compressive engagement with said thrust bushing, whereby said lead screw is restrained from axial movement with respect thereto,
said bushing including a plurality of gear teeth formed on a peripheral surface thereof,
a pinion gear mounted on said frame and engagable with the gear teeth on said bushing, whereby a controlled rotation of said pinion gear effects a corresponding rotation of said bushing with respect to the frame, and whereby said bushing and said lead screw are threadedly moved axially with respect to the frame and a fine positioning of the transducer head relative to the selected track is achieved,
said thrust bushing further including a tab projecting outwardly from an off-center location thereon, and
cam means selectively engagable with said tab to re-position said bushing to a prescribed, nominal position.

* * * * *